United States Patent
Yoshiuchi

(10) Patent No.: US 7,904,506 B2
(45) Date of Patent: Mar. 8, 2011

(54) CONTEXT INFORMATION MANAGEMENT SYSTEM

(75) Inventor: Hideya Yoshiuchi, Beijing (CN)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 11/657,091

(22) Filed: Jan. 24, 2007

(65) Prior Publication Data
US 2007/0192331 A1    Aug. 16, 2007

(30) Foreign Application Priority Data

Feb. 2, 2006    (JP) ................. 2006-025209

(51) Int. Cl.
G06F 15/16    (2006.01)
(52) U.S. Cl. .................. 709/203; 709/206; 709/227
(58) Field of Classification Search ............ 709/203
See application file for complete search history.

(56) References Cited

U.S. PATENT DOCUMENTS

| | | | |
|---|---|---|---|
| 6,463,460 B1 * | 10/2002 | Simonoff | 709/203 |
| 6,650,901 B1 * | 11/2003 | Schuster et al. | 455/456.1 |
| 6,658,095 B1 * | 12/2003 | Yoakum et al. | 379/93.01 |
| 6,853,634 B1 * | 2/2005 | Davies et al. | 370/349 |
| 6,986,060 B1 * | 1/2006 | Wong | 726/26 |
| 7,424,538 B2 * | 9/2008 | Igarashi et al. | 709/227 |
| 7,505,482 B2 * | 3/2009 | Adamczyk et al. | 370/469 |
| 7,603,411 B1 * | 10/2009 | Davies et al. | 709/204 |
| 2002/0049847 A1 * | 4/2002 | McArdle et al. | 709/227 |
| 2003/0105820 A1 * | 6/2003 | Haims et al. | 709/205 |
| 2004/0088543 A1 * | 5/2004 | Garg et al. | 713/157 |
| 2004/0225878 A1 * | 11/2004 | Costa-Requena et al. | 713/150 |
| 2005/0165894 A1 * | 7/2005 | Rosenberg et al. | 709/205 |
| 2005/0267895 A1 * | 12/2005 | Yoshiuchi et al. | 707/10 |
| 2006/0069697 A1 * | 3/2006 | Shraim et al. | 707/102 |
| 2006/0211423 A1 * | 9/2006 | Ejzak et al. | 455/445 |
| 2007/0110009 A1 * | 5/2007 | Bachmann et al. | 370/338 |

FOREIGN PATENT DOCUMENTS

| | | |
|---|---|---|
| JP | 10-336319 | 5/1997 |
| JP | 2005-208725 | 1/2004 |

* cited by examiner

*Primary Examiner* — William C Vaughn, Jr.
*Assistant Examiner* — Joiya M Cloud
(74) *Attorney, Agent, or Firm* — Stites & Harbison PLLC; Juan Carlos A. Marquez, Esq.

(57) ABSTRACT

The context information management system enables the management of context information while maintaining the security of user information. It includes a user domain management server that manages a list of domains in which users have an account, and a one-time account management server that manages temporarily issued one-time accounts for a user's account. For an account information notifying request from a client, it notifies an account group ID corresponding to the user ID, and a one-time account issued for the account group ID to the client, thereby enabling the management of the user's account and context information while hiding the user ID.

5 Claims, 17 Drawing Sheets

FIG. 16

| | Packet | Field 2 | Field 3 | Field 4 |
|---|---|---|---|---|
| PF-01 | PACKET TYPE (ACCOUNT INFORMATION NOTIFYING REQUEST) | ACCOUNT INFORMATION REQUESTING ADDRESS | USER ID | ACCOUNT GROUP ID |
| PF-02 | PACKET TYPE (ONE-TIME ACCOUNT NOTIFYING REQUEST) | ACCOUNT INFORMATION NOTIFYING ADDRESS | ACCOUNT GROUP ID | CONTEXT MANAGEMENT SERVER LIST |
| PF-03 | PACKET TYPE (ONE-TIME ACCOUNT SUBMITTING REQUEST) | USER ID | ACCOUNT GROUP ID | |
| PF-04 | PACKET TYPE (ONE-TIME ACCOUNT SUBMISSION) | ACCOUNT GROUP ID | ACCOUNT SUBMITTING ADDRESS | ONE-TIME ACCOUNT |
| PF-05 | PACKET TYPE (ACCOUNT INFORMATION NOTIFICATION) | ACCOUNT GROUP ID | ONE-TIME ACCOUNT LIST | |
| PF-06 | PACKET TYPE (CONTEXT INFORMATION NOTIFYING REQUEST) | CONTEXT INFORMATION NOTIFYING ADDRESS | USER ACCOUNT | |
| PF-07 | PACKET TYPE (CONTEXT INFORMATION NOTIFICATION) | CONTEXT INFORMATION NOTIFYING ADDRESS | USER ACCOUNT | CONTEXT INFORMATION |

CONTEXT INFORMATION MANAGEMENT SYSTEM

CLAIM OF PRIORITY

The present application claims priority from Japanese application JP 2006-025209 filed on Feb. 2, 2006, the content of which is hereby incorporated by reference into this application.

FIELD OF THE INVENTION

The present invention relates to improvements in a system that manages users' context information.

As seen from the widespread use of cellular phones and notebook personal computers, user-owned terminals are being miniaturized steadily. The users always carry about terminals, with the result that the need to select time and a place for communications with others is fading. Although means for access to others have been thus diversified, in actual environments, party's situations must be considered during communication with the party.

There is a context information management system as technology for solving this problem. Context, which refers to information about human peripheral situations, contains wide contents from operating information of users'-owned terminals to a current position, operation information, and the like. In the context information management system, users submit these pieces of context information to a context management server manually or automatically. The context management server notifies submitted context information to other users who request latest context information. Since the context information is notified to the users each time it is updated, the users can always obtain the latest context information.

One of application examples of context information is the selection of a called terminal. This function is as follows. When other users take action such as making a call and mail sending to communicate with a user having plural terminals, the call is sent to an optimum terminal according to a user's situation and favorite. Examples of such as system are a system in which called persons submit an optimum communication method and terminal type in advance (e.g., JP-A No. 336319/1998), and a system that reflects callers-specified priority in that system (e.g., JP-A No. 208725/2005).

SUMMARY OF THE INVENTION

In the above-described conventional examples, the context management server must have information of all users-owned terminals. However, generally, users have plural accounts in plural domains, and there are diverse communication media of terminals such as cellular phone networks and IP networks, while the context management server often manages context information in a single domain. To solve this, one idea is to use a context management server that targets plural domains for management. However, users' accounts and terminal information must be collected across a domain boundary. Account information and terminal information are highly confidential information, and it is difficult for managers of other domains to obtain account information issued from different domains and different service providers. Even if information on all accounts of a user has been collected with user's agreement, there is a problem in that it becomes necessary to provide within a system a server that collectively manages user's personal information, so that the risk of information leak increases.

To solve the above-described problem, a context information management system of the present invention includes a user domain management server that manages user IDs and domain names in which users have a terminal and an account corresponding to the terminal, and requests the issuance of a temporary one-time account from context management servers of respective domains to which user accounts belong, and a one-time account management server that groups and manages sets of issued one-time accounts. On receiving an account information notifying request, the user domain management server requests the one-time account management server to notify one-time accounts corresponding to all user accounts to the requesting source of account information. At the same time, it requests context management servers of all domains to which accounts of a requested user belong to issue one-time accounts. The context management servers of the respective domains issue the one-time accounts, and submits them to the one-time account management server. The one-time account management server notify a set of the one-time accounts to the requesting source of account information, and thereby the account information requesting source can access all user's terminals by the one-time accounts. Since the one-time accounts are temporary ones, even in the event that they leak, user's personal information never leaks.

Therefore, when a called terminal is selected using context information for a user having plural accounts, particularly when the user has the accounts over plural domains, since context information of the plural accounts is managed by one-time accounts, information about the user-owned accounts can be collectively managed while the security of personal information is maintained.

BRIEF DESCRIPTION OF THE DRAWINGS

FIG. 16 is a list of packet formats; and

DETAILED DESCRIPTION OF THE PREFERRED EMBODIMENTS

Hereinafter, one embodiment of the present invention will be described with reference to the accompanying drawings.

Figure 1:
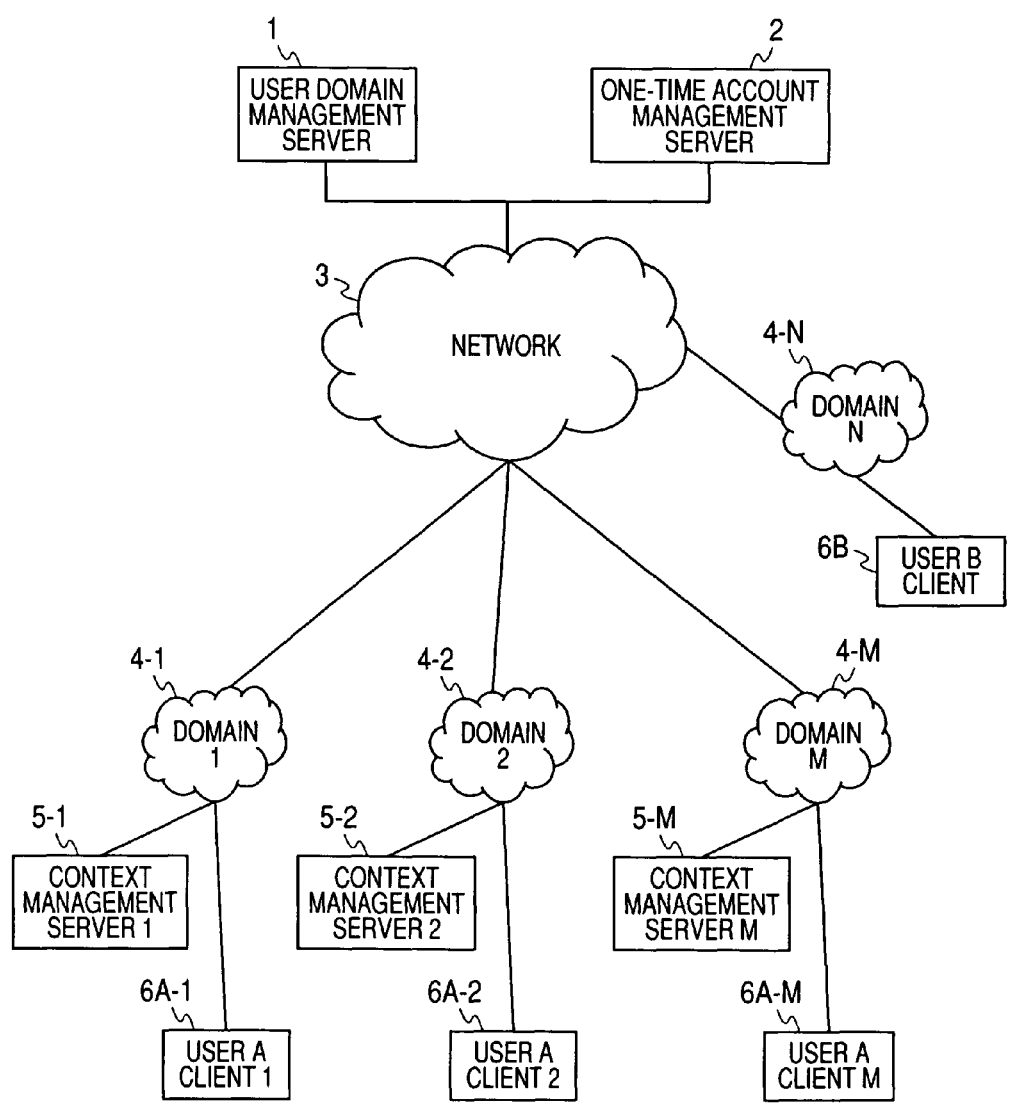
FIG. 1 is a network block diagram of a context information management system showing one embodiment of the present invention.

FIG. 1 shows an example of a system to which the present invention is applied, and is a block diagram of a context information management system in a network that comprises plural domains. The context management system comprises a user domain management server 1 that manages pairs of user IDs and domain names to which user accounts belong, a one-time account management server 2 that manages one-time accounts for user accounts of respective domains according to requests from the user domain management server, context management servers 5-1 to 5-M that manages users' context information in respective domains, and user clients 6A-1 to 6A-M, and 6B. These system components exist over plural domains 1-N (4-1 to 4-N), which are connected to each other through a network 3.

The user domain management server 1 manages pairs of user IDs and domain names to which user accounts belong. In FIG. 1, since a user A has clients 1-M (6A-1 to 6A-M) in domains 1 (4-1) to M (4-M), the user domain management server 1 manages the user A by a database storing links between a user ID and the context management servers 1 to M (5-1 to 5-M). It also has a function to request the context server to issue a one-time account corresponding to a user account.

The one-time account management server 2 requests a set of the one-time accounts corresponding to a set of specified domains according to a request from the user domain management server 1. One-time accounts issued by the context management servers 5-1 to 5-M are treated as grouped accounts, and managed by a one-time account information database.

The context management servers 5-1 to 5-M manage users' context information in one domain. For example, in FIG. 1, the context management server 1 manages context information of user A client 1 (6A-1). The user clients 6A-1 to 6A-M and 6B denote terminals owned by users, and provide users with communication means such as IP phones and instant messages, and a function to browse context information.

Figure 2:
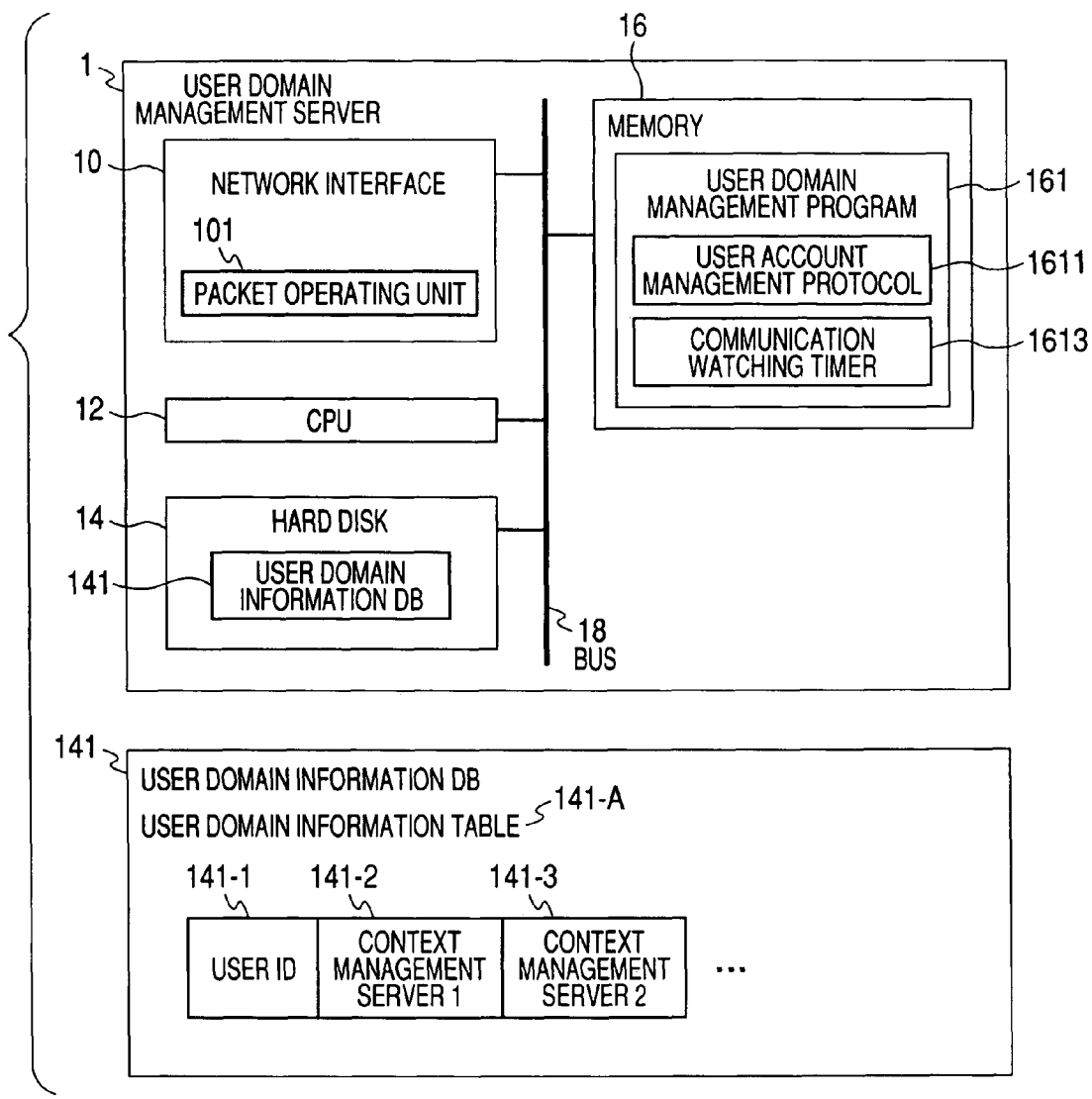
FIG. 2 is a functional block diagram of a user domain management server.

The following describe a detailed configuration of respective devices. FIG. 2 is a functional block diagram of the user domain management server 1. The user domain management server 1 has basic hardware components such as a network interface 10, a CPU 12, a hard disk 14, a memory 16, and a bus 18, and performs communications with the network 3 via a packet operating unit 101 on the network interface 10. It has a user domain management program 161 that manages the correspondences between users' IDs and domains, on the memory 16. The user domain management program 161 comprises a user account control protocol 1611 that performs control such as the notice, issue request, submission of a one-time account, and a communication monitoring timer 1613 that monitors communication states and performs time-out processing as required. The hard disk 14 stores a user domain information DB 141 including a user domain information table 141-A that manages sets of user IDs and context management servers of domains to which user-owned accounts belong, and the user domain information DB 141 is accessed by a user domain management program 161 loaded onto the memory 16. The user domain information DB 141 may be stored on the memory 16 according to a data quantity.

Figure 3:
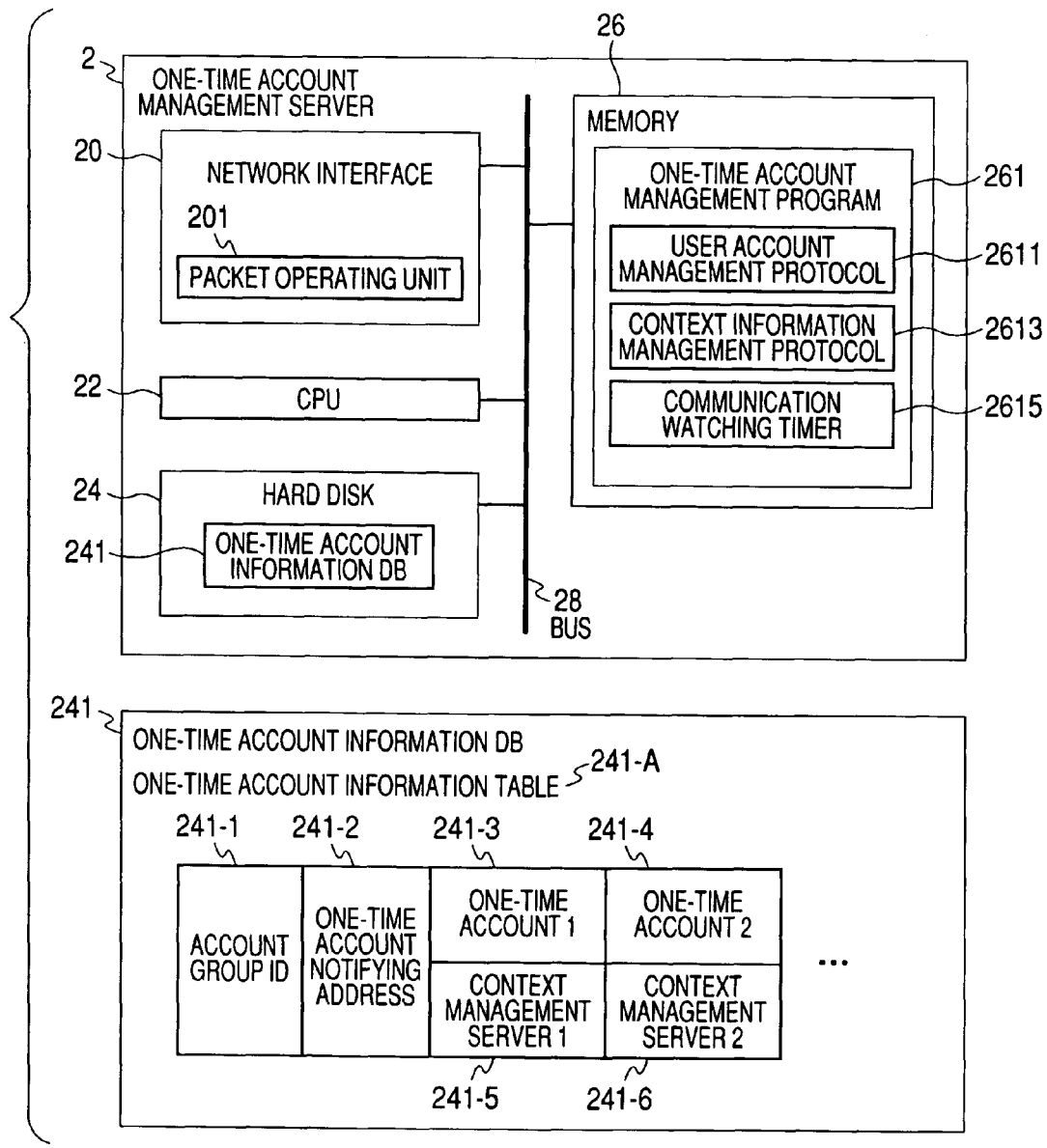
FIG. 3 is a functional block diagram of a one-time account management server.

FIG. 3 is a functional block diagram of the one-time account management server 2. The one-time account management server 2 has basic hardware components such as a network interface 20, a CPU 22, a hard disk 24, a memory 26, and a bus 28, and performs communications with the network 3 through a packet operating unit 201 on a network interface 20. A one-time account management program 261 is placed on the memory 26. It manages one-time accounts issued to user accounts. The one-time account management program 261 comprises a user account control protocol 2611 that performs control such as the notice, issue request, submission of an one-time account, a context information control protocol 2613 that performs collection and notification of context information, and a communication monitoring timer 2615 that monitors communication states and performs time-out processing as required. The hard disk 24 stores a one-time account information DB 241 including a one-time account information table 241-A that manages account group IDs for identifying a group of one-time accounts, notification destination addresses of one-time accounts, and pairs of one-time accounts and context management servers that issued them. The one-time account information DB 241 is accessed by a one-time account management program 261 loaded onto the memory 26. The one-time account information DB 241 may be stored in on memory 26 according to data amounts.

Figure 4:
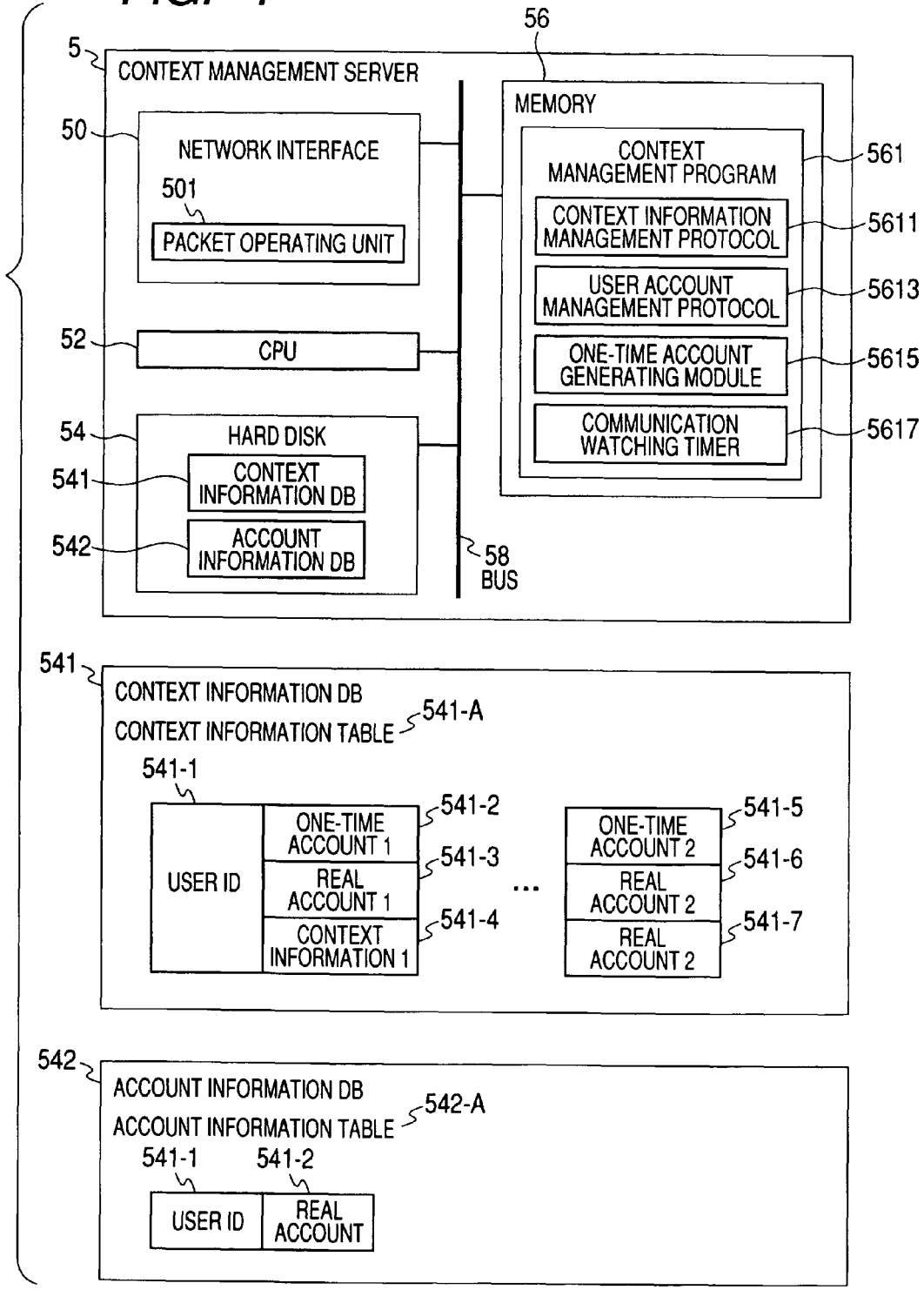
FIG. 4 is a functional block diagram of a context management server.

FIG. 4 is a functional block diagram of the context management server 5. The context management server 5 has basic hardware components such as a network interface 50, a CPU 52, a hard disk 54, a memory 56, and a bus 58, and performs communications with the network 3 Via a packet operating unit 501 on the network interface 50. A context management program 561 that manages users' context information is placed on the memory 56. The context management program 561 comprises a context information control protocol 5611 that performs collection and notification of context information, a user account control protocol 5613 that performs control such as notification, issue request, and submission of one-time accounts, a one-time account generation module 5615 that issues one-time accounts, and a communication monitoring timer 5617 that monitors communication states and performs time-out processing as required. The hard disk 54 stores a context information DB 541 including a context information table 541-A that user IDs as users' context information, one-time accounts, and sets of actual accounts and context information, and an account information DB 542 including an account information table 542-A that manages pairs of user IDs and actual accounts. These DBs are accessed by the context management program 561 loaded onto the memory 56. The context information DB 541 and the account information DB 542 may be stored in on the memory 56 depending on data amounts.

Figure 5:
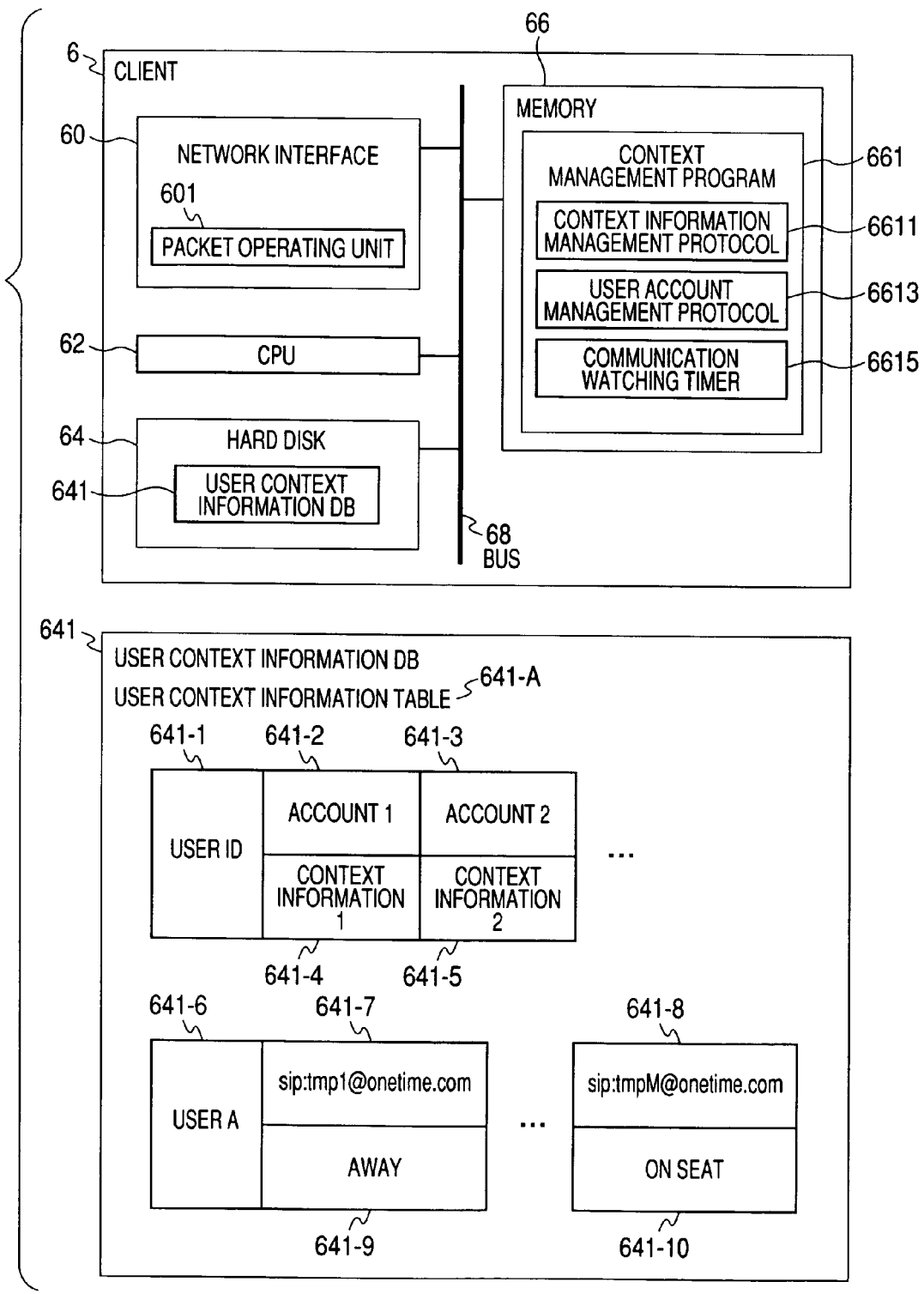
FIG. 5 is a functional block diagram of a client.

FIG. 5 is a functional block diagram of a client 6. The client 6 has basic hardware components such as a network interface 60, a CPU 62, a hard disk 64, a memory 66, and a bus 68, and performs communications with the network 3 via a packet operating unit 601 on the network interface 60. On the memory 66, a context management program 661 that manages users' context information is placed. The context management program 661 comprises a context information control protocol 6611 that performs collection and notification of context information, a user account control protocol 6613 that performs control such as notification, issue requests, and submission of one-time accounts, and a communication monitoring timer 5615 that monitors communication states, and performs time-out processing as required. The hard disk 54 stores a context information DB 641 including a context information table 641-A that manages user IDs as users' context information and pairs of accounts and context information. The context information DB 641 is accessed by a context management program 661 loaded onto the memory 66. The context information DB 641 may be stored in on the memory 66 depending on data amounts.

Figure 6:
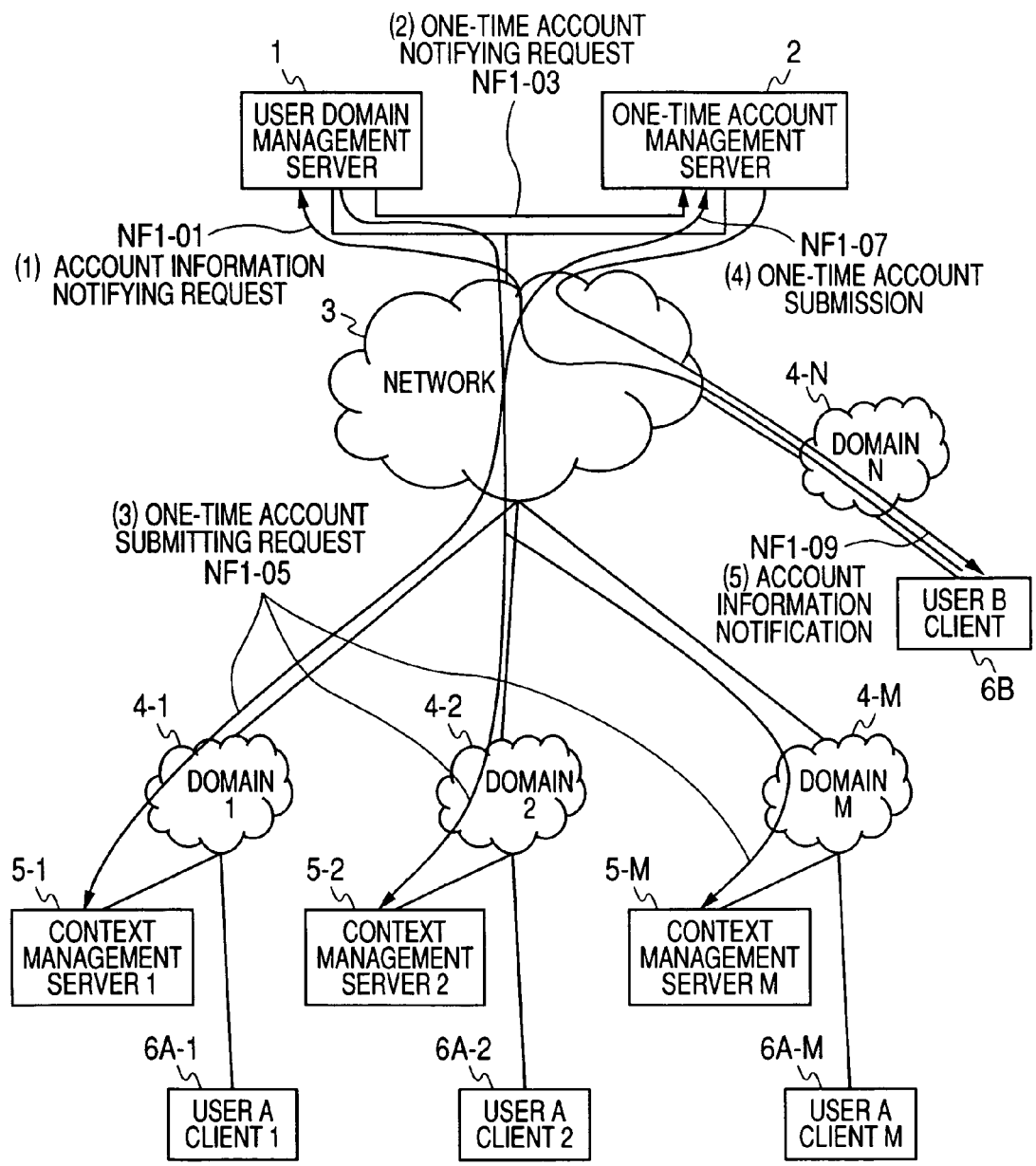
FIG. 6 is a network block diagram for explaining account information acquisition processing initiated by user clients.

The following describes user account information management by a one-time account. FIG. 6 is a schematic diagram when a user B client 6B of a domain N (4-N) obtains information on accounts of a user A. For example, this processing is performed when information of all accounts owned by a user A is obtained during access to the user A by a user B.

Acquisition processing of user account information begins when the user B client 6B sends an account information notifying request to the user domain management server 1 (NF1-01). On receiving the account information notifying request, the user domain management server 1 obtains domains to which the requested user's account belongs from the user domain information DB 141, and sends a one-time account notifying request to the one-time account management server 2 (NF1-03). Since the user A owns clients in the domains 1 to M, the one-time account is notified to the domains 1 to M.

The one-time account notifying request NF1-03 contains information such as notification destinations of a one-time account, and a list of context management servers that belong to domains in which the one-time account is registered. The one-time account management server 2 waits for one-time account submission from context management servers of the domains contained in the list.

After sending the one-time account notifying request to the one-time account management server 2, the user domain management server 1 requests the context management servers of the respective domains (1 to M) to register the one-time account (NF1-05). On receiving the one-time account submission request NF1-05, the respective context management servers issue the one-time account and register it in the one-time account management server 2 (NF1-07). The one-time account issued here is effective only within a predetermined term, and becomes invalid after the term has elapsed. After the one-time account management server 2 confirms that all context management servers specified in the one-time account notifying request NF1-03 have registered the one-time account it notifies the user B client 6B of a set of one-time accounts issued to the user A (NF1-09). Through the above processing, the user B obtains information on all accounts owned by the user A.

Figure 7:
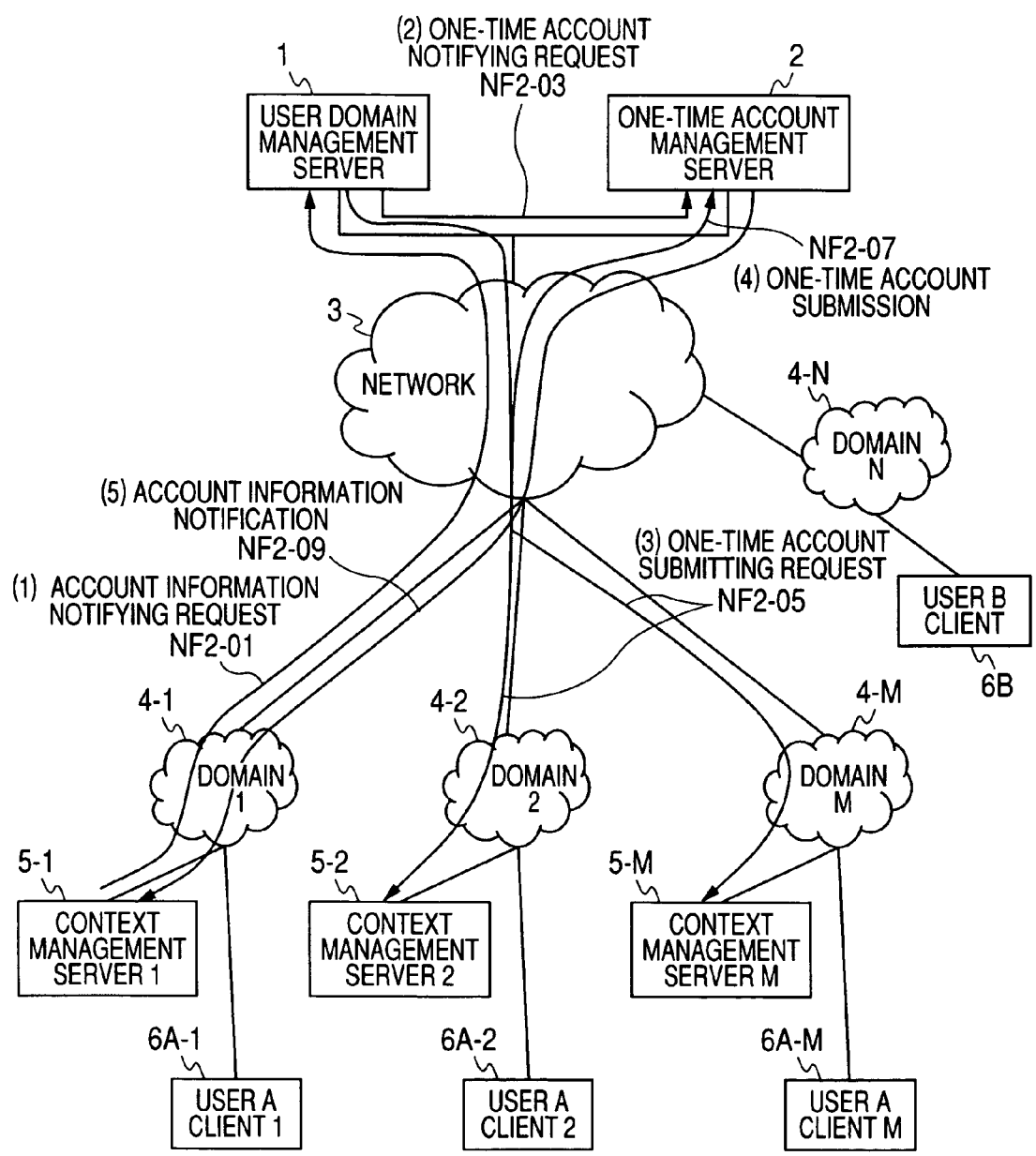
FIG. 7 is a network block diagram for explaining account information acquisition processing initiated by context management servers.

The acquisition of users' account information is not limited to clients. FIG. 7 is a schematic diagram when the context management server 5-1 of the domain 1 (4-1) obtains information of accounts belonging to other than the domain 1 of the user A. For example, this processing is performed when a call arrives in the user A client 1 (6A-1), and to forward it to other terminals of the user A, the context management server 1 (5-1) obtains information of other accounts owned by the user A.

Processing of obtaining user account information begins when the context management server 1 (5-1) sends an account information notifying request to the user domain management server 1 (NF2-01). On receiving the account information notifying request, the user domain management server 1 obtains a domain to which a requested user's account belongs, from the user domain information DB 141, and sends a one-time account notifying request to the one-time account management server 2 (N F1-03). Since the user A owns clients in the domains 1 to M, although notification targets of the one-time account is domains 1 to M, when a requesting source of account information is one of context management servers contained in the user domain information DB 141, account information does not need to be obtained as for domains to which the context management servers belong. Therefore, the domains 2 to M are specified in the one-time account notifying request NF2-03 that the user domain management server 1 sends to the one-time account management server 2. Subsequent processing is the same as that in FIG. 6.

Figure 8:
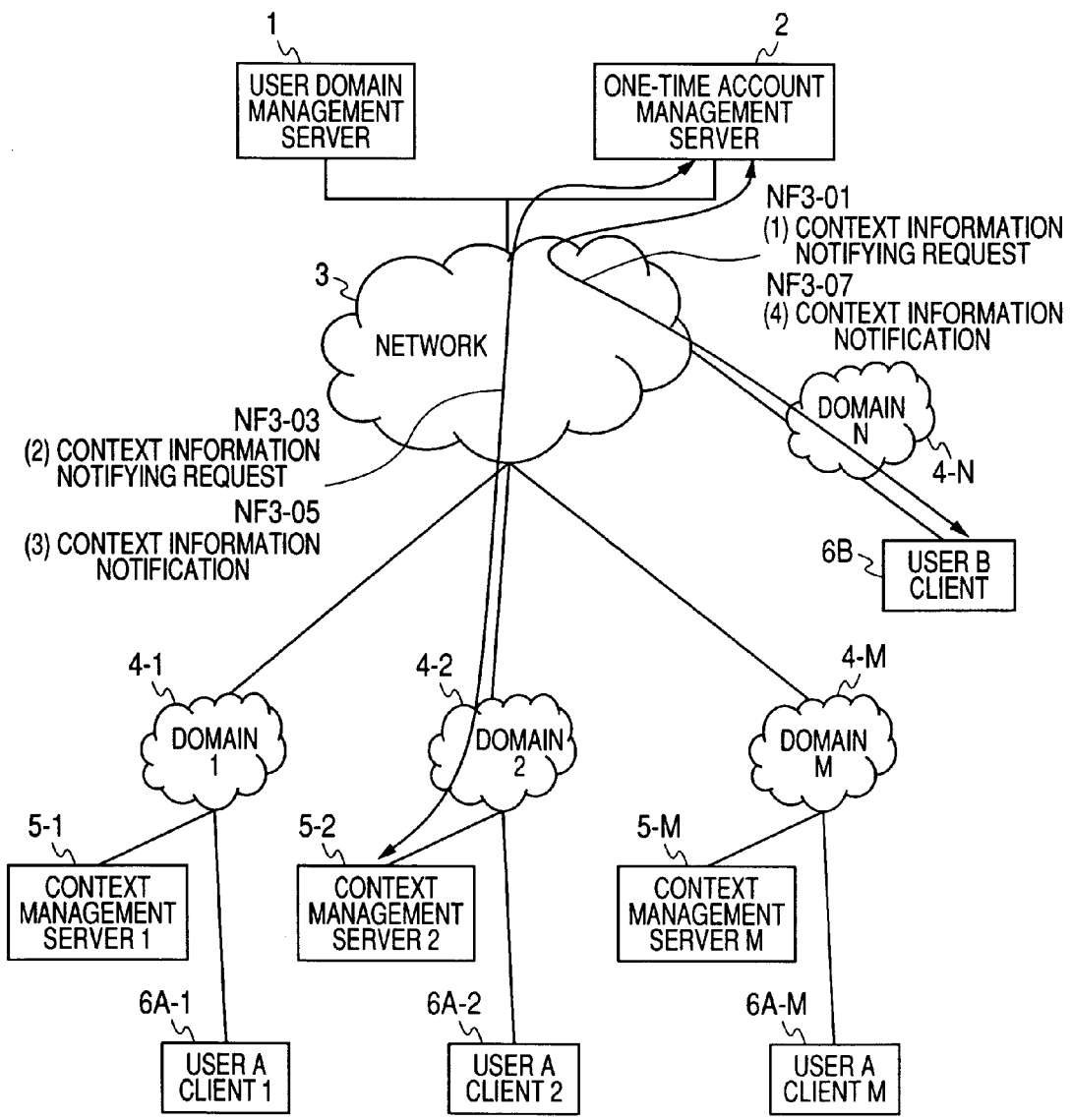
FIG. 8 is a network block diagram for explaining context information acquisition processing.

FIG. 8 is a schematic diagram of processing of obtaining context information of an actual account from a registered one-time account. It is assumed that a requesting source of context information has obtained a one-time account of a target user by the processing of FIG. 6 or 7. In FIG. 8, the user B client 6B obtains context information of the user A client 2 (6A-2). First, the user B client 6B sends a context information notifying request to the one-time account management server 2 (NF3-01). For the notification of context information, a one-time account already obtained is specified.

On receiving the context information notifying request, the one-time account management server 2 consults the one-time account information DB 241 to extract the context management server 2 (5-2) that registered the one-time account, and forwards the context information notifying request (NF3-03). On receiving the context information notifying request, the context management server 2 sends the requested context information to the one-time account management server 2 (NF3-05). Last, the one-time account management server 2 sends the context information to user B client 6B, and terminates the acquisition processing of context information.

Figure 9:
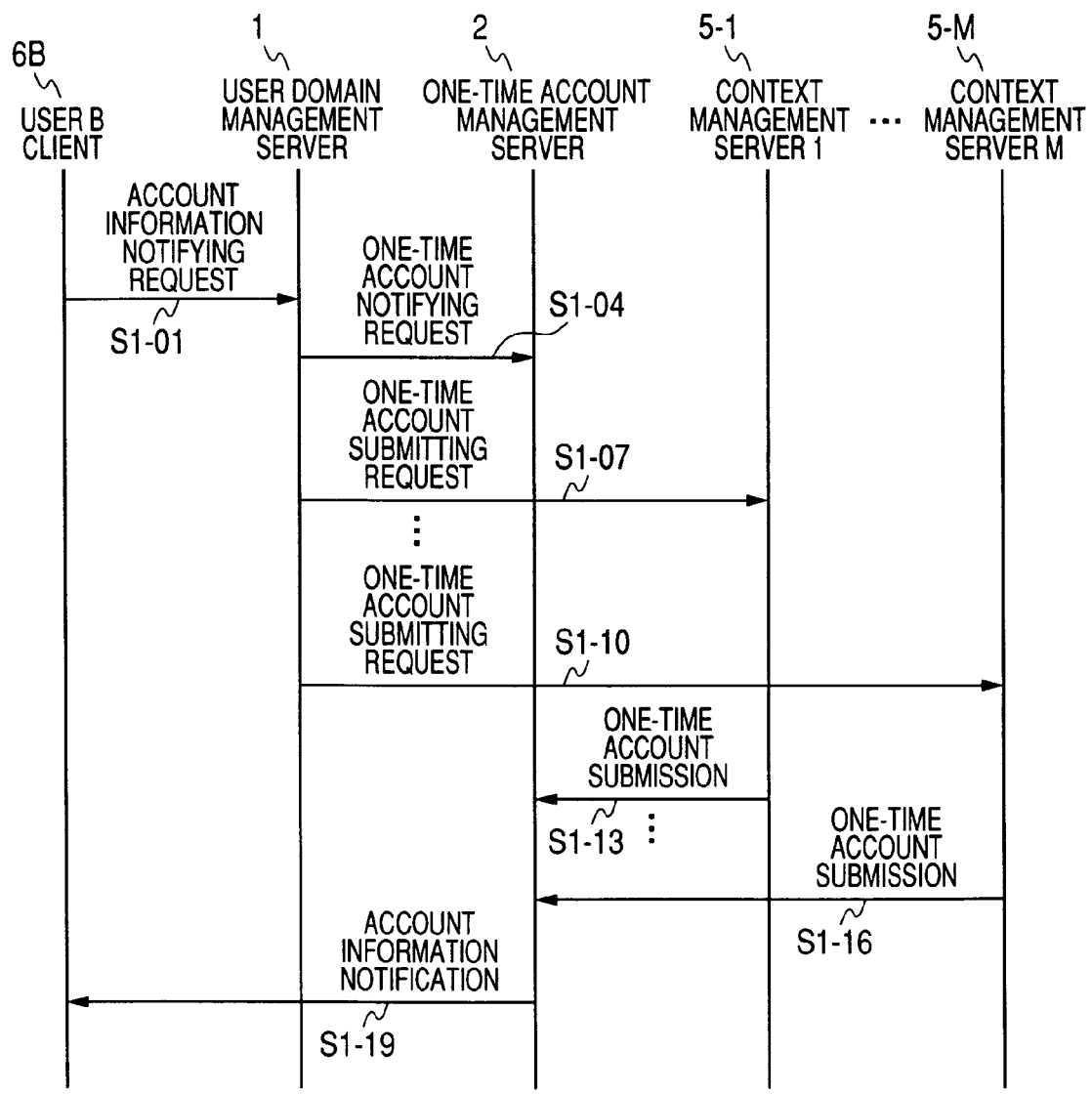
FIG. 9 is a sequence diagram for explaining account information acquisition processing initiated by user clients.

The following details account information management, using a communication sequence. FIG. 9, which details FIG. 6, shows processing of the user B client 6B obtaining account information of the user A. First, the user B client 6B sends an account information notifying request S1-01 to the user domain management server 1. The contents of the account information notifying request are shown in FIG. 16. The account information notifying request PF-01 includes a packet type (account information notifying request), an account information requesting address, a user ID, and an account group ID. Here, an account information requesting source is the user B client 6B. A user ID indicates whose account information to notify, and in this example, specifies the user A. An account group ID is an identifier used to identify a target user of indicated account information when the account information is received, and the requesting source of the account information issues a unique value at random and passes it to the user domain management server 1.

On receiving the account information notifying request S1-01, the user domain management server knows that the user B requests account information of the user A, and obtains a list of context management servers of domains that the user A has an account, from the user domain information table 141-A. Then, it sends one-time account notifying request S1-04 to one-time account management server 2. The contents of the one-time account notifying request are shown in FIG. 16. A one-time account notifying request PF-02 includes a packet type (one-time account notifying request), an account information notifying address, an account group ID, and a context management server list. Since account information is requested by the user B, the address of the user B client 6B is specified as an account information notifying address. When the notification of a one-time account is requested, what user the one-time account is registered for must be specified in the one-time account management server 2. Now, the user B requests account information of the user A.

However, if a user ID is directly specified, account information of the user A is temporarily collected in the one-time account management server, so that information security is not maintained. Accordingly, to specify a user, an account group ID indicated to the user domain management server 1 by the user B client 6B is used. At this point in time, only the user B client 6B and the user domain management server know the correspondence between the account group ID and the user ID. Therefore, even if information leaks from the one-time account management server, it cannot be determined on what user the information is, so that information security is maintained.

On receiving the one-time account notifying request S1-04, the one-time account management server 2 knows from information contained in the message that account information for a certain user specified by the account group ID is requested by the user B client 6B, and the owner of the account has accounts in servers specified in the context management server list. The one-time account management server 2 waits that the respective context management servers register the one-time account.

The user domain management server 1 that requested the notification of account information from the one-time account management server 2 sends a one-time account submitting request to all context management servers corresponding to the user A (S1-07, 10). The contents of a one-time account submitting request is shown in FIG. 16. The one-time account submitting request PF-03 includes a packet type (one-time account submitting request), a user ID, and an account group ID. The user ID specifies what user the one-time account is registered for, and in this example, indicates the user A. The user ID and the account group ID are used by the context management servers to hide user's personal information when the one-time account is registered in the one-time account management server 2.

The context management servers 5-1 to 5-M that received the one-time account submitting request issue a one-time account to a specified user ID. The issued one-time account is stored in the context information table 541-A as a set of a user ID, a one-time account, an actual account, and context information. After that, the issued one-time account is stored in the one-time account management server (S1-13, 16). When the one-time account is submitted, the context management servers, to hide user's information, use the account group ID specified in the one-time account submitting requests S1-7 and S1-10 to specify a user for which the one-time account to be submitted is targeted. FIG. 16 shows the contents of one-time account submission. The one-time account submission PF-04 includes a packet type (one-time account submission), an account group ID, an account submitting address, and a one-time account. The account submitting address is the address of a context management server itself.

On receiving the one-time account submissions S1-13 and S1-16, the one-time account management server 2 checks an account group ID of a one-time account submission message and an account submitting address, and submits the one-time account to a corresponding table of the one-time account information table 241-A. Next, the one-time account management server 2 determines whether, for the specified account group ID, one-time account submissions in all context management servers are completed. Upon completion of all account submissions, the one-time account management server 2 sends account information notification to the one-time account notification destination address (user B client 6B) of the one-time account information table 241-A (S1-19). FIG. 16 shows the contents of account information submission. The account information submission PF-05 includes a packet type (account information notification), an account group ID, and a list of one-time accounts. In the account information notification S1-19, an account group ID is included, but a user ID is not included. However, since the client 6B, which is the requesting source of account information, manages pairs of user IDs and account group IDs, can determine what users the indicated accounts are for. Moreover, the indicated accounts are one-time accounts, and even if these leak, actual account information of the users will not leak.

Figure 10:
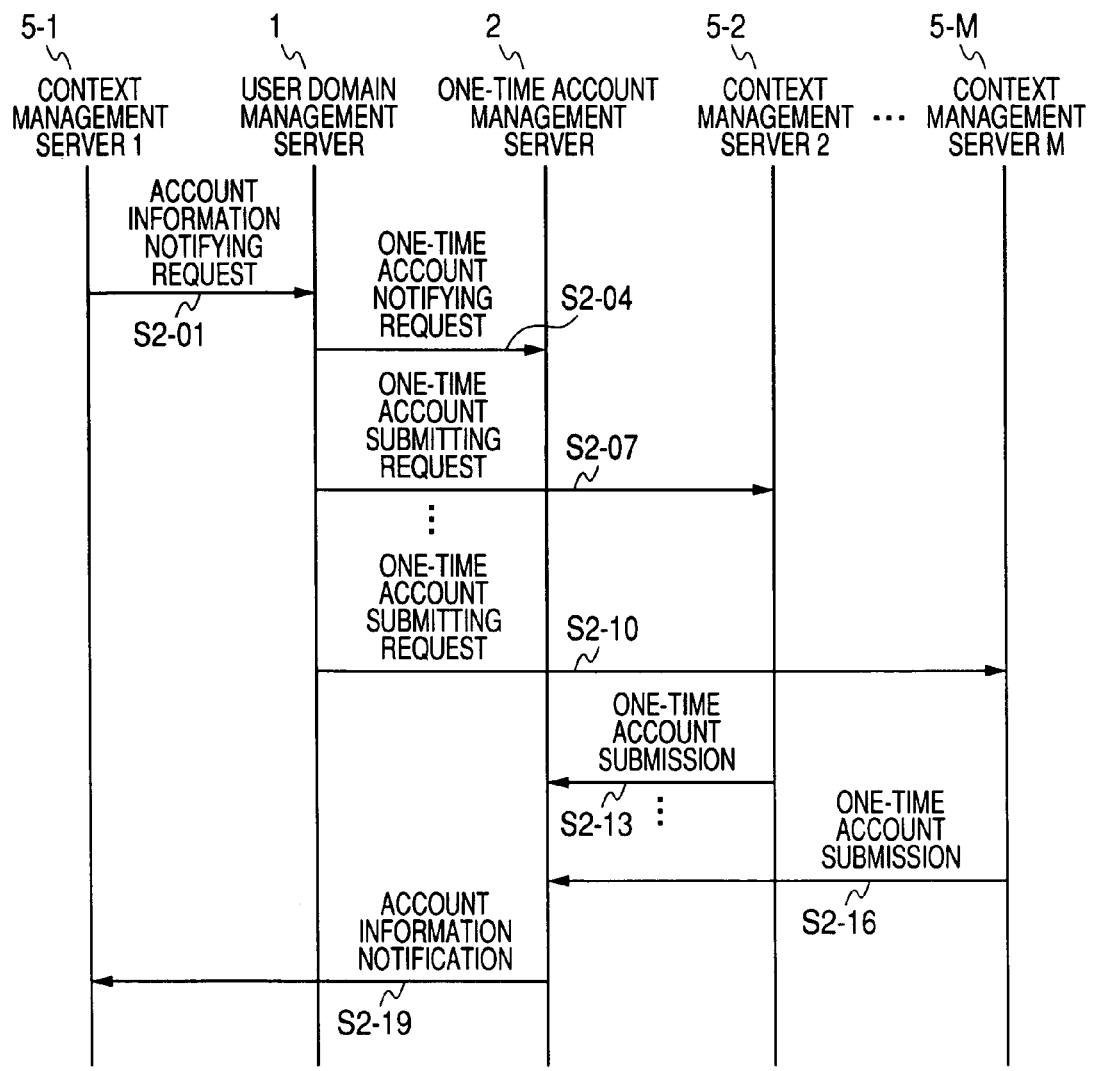
FIG. 10 is a sequence diagram for explaining account information acquisition processing initiated by context management servers.

The following details processing that a context management server requests user account information. FIG. 10, which details FIG. 7, shows processing that the context management server 1 (5-1) obtains account information of the user A. First, the context management server 1 (5-1) sends an account information notifying request S2-01 to the user domain management server 1. On receiving the account information notifying request S2-01, the user domain management server knows that the context management server 1 (5-1) requests account information other than the domain 1 (4-1) of the user A, and obtains a list of context management servers of domains in which the user A has an account, from the user domain information table 141-A. Since the requesting source of account information is included in the context management server list, when the user domain management server sends the one-time account notifying request S1-04 to the one-time account management server 2, it excludes the context management server 1 (5-1) from the list, and specifies the context management servers 2-M (5-2 to 5-M). Likewise, when it sends the one-time account submitting request to context management servers, context management servers 2-M (5-2 to 5-M) are targeted (S2-07 to S2-10). Subsequent processings S2-13 to S2-19 are the same as S1-13 to S1-19.

Figure 11:
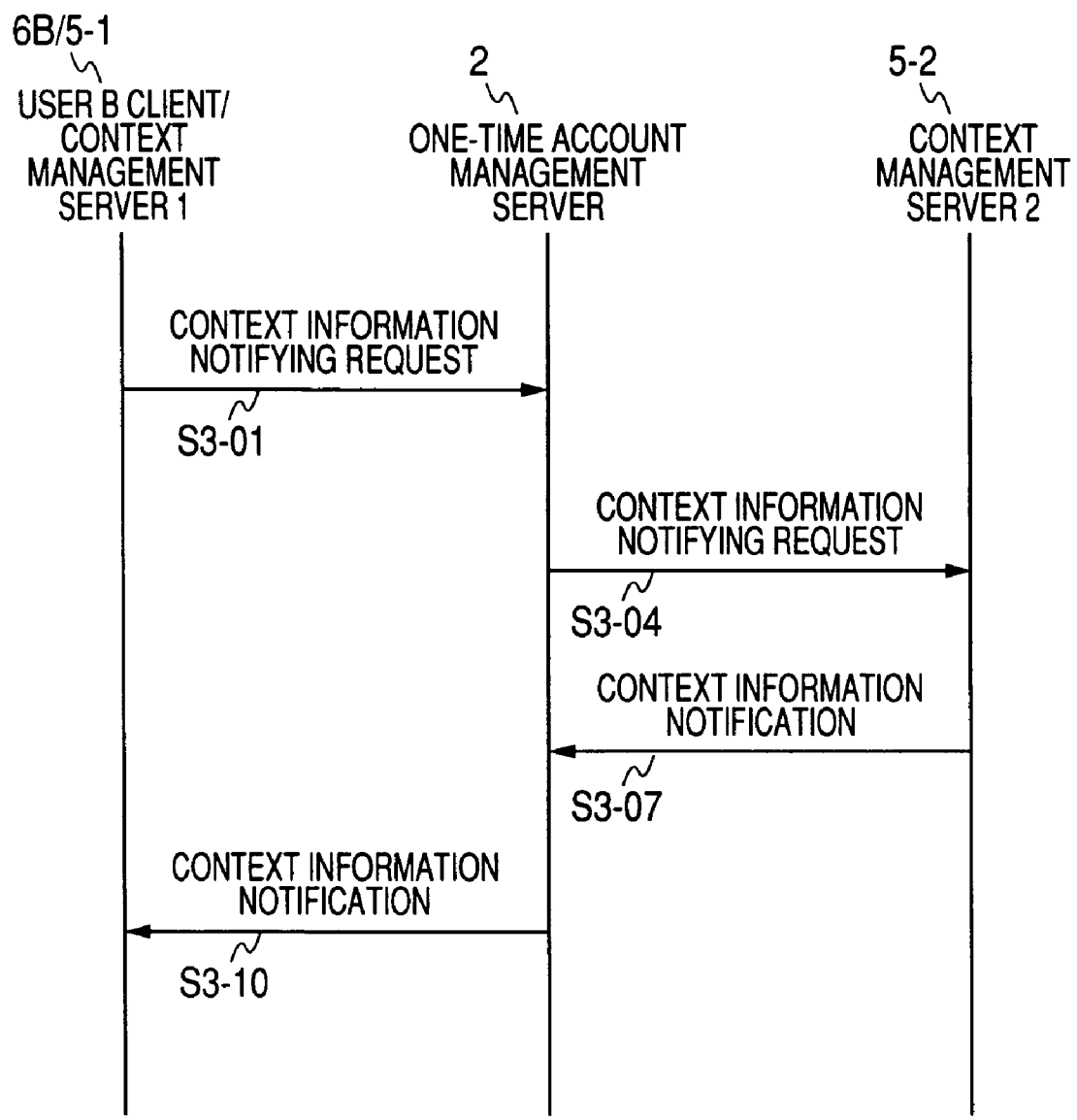
FIG. 11 is a sequence diagram for explaining context information acquisition processing.

FIG. 11, which details FIG. 8, shows processing that the user B client 6B or context management server 1 (5-1) obtains context information for an account of the user A that belongs to the domain 2 (4-2). Hereinafter, as an example, it is assumed that the requesting source of context information is the user B client 6B, and a one-time account belongs to the domain of the one-time account management server.

First, the user B client 6B sends a context information notifying request S3-01 to the one-time account management server. The contents of the context information notifying request are shown in FIG. 16. The context information notifying request PF-06 includes a packet type (context information notifying request), a context information requesting address, and a user account. Since account information obtained by the user B client 6B is a one-time account 2 (241-2) that context management server 2 (5-2) registered in the one-time account management server 2, it is specified as a user account.

On receiving the context information notifying request S3-01, the one-time account management server 2 searches the one-time account information table 241-A by using a user account as key. As a result of the searching, since the context management server 2 (5-2) that submitted the one-time account 2 (241-4), the one-time account management server 2 forwards a context information notifying request to the context management server 2 (5-2) (S3-04). On receiving the context information notifying request, the context management server 2 (5-2) searches the context information table 541-A by using specified user account as key, and obtains requested context information. To send the context information to a context information requesting source, the context management server 2 (5-2) sends context information notification S3-07 to the one-time account management server 2. The contents of the context information notification are shown in FIG. 16. The context information notification PF-07 includes a packet type (context information notification), a context information notifying address, a user account, and context information. On receiving the context information notification S3-07, the one-time account management server 2 forwards a message to a notification destination of the context information (S3-10). Through the above processing, the user B client 6B can obtain desired context information.

Figure 17:
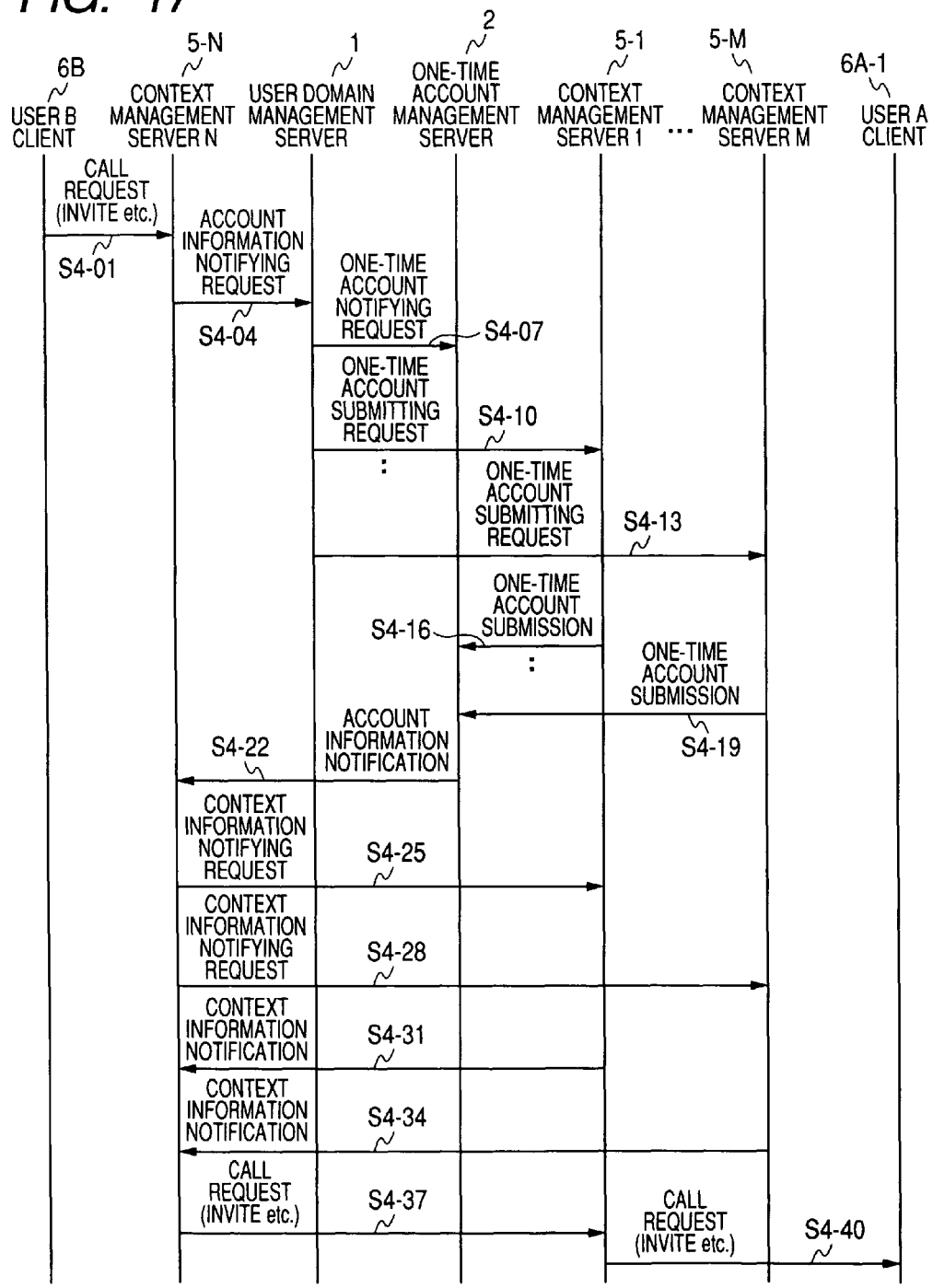
FIG. 17 is a sequence diagram for explaining call request processing.

FIG. 17 shows a sequence executed when context information is applied to call control. According to the present invention, when the user B communicates with the user A, instead of the address of a client owned by a user A, only the user ID of the user A may be specified for the communication. The user B sends a call request to the context management server N (5-N) of the domain to which it belongs (S4-01). The call request is realized, for example, by an INVITE message or the like of SIP (Session Initiation Protocol). The user B specifies user ID of user A as a destination. On receiving the call request, the context management server N (5-N), to obtain account information of the specified user, sends an account information notifying request to the user domain management server 1 (S4-04). After that, processing until the context management server N receives account information notification (S4-22) is the same as processing from the sending of account information notifying request (S1-01) to the reception of account information notification (S1-19) in FIG. 9. On obtaining account information of the user A, the context management server N, to obtain context information of all obtained accounts, sends a context information notifying request to the context management server (S4-25, S4-28). The destination of the context information notifying request is a context management server that exists in a domain to which a one-time account belongs. On receiving the context information notifying request, the respective context management servers reply context information notification to the context management server N (5-N) (S4-31, S4-34). On obtaining all context information, the context management server N (5-N) determines to what one-time account a call request is to be sent. For the determination, the contents of the context information (presence, offline, and absence) and the priority of clients are used. After deciding an optimum message transmission destination, the context management server N (5-N) forwards the call request to the context management server (S4-37). FIG. 17 shows the process of forwarding the call request to the context management server 1 (5-1). On receiving the call request, the context management server 1 (5-1) recognizes that the destination is the one-time account that it issued in S4-16, and forwards the call request to the user A client 1 (6A-1). By the above processing, call processing with only a user ID specified becomes possible.

Figure 12:
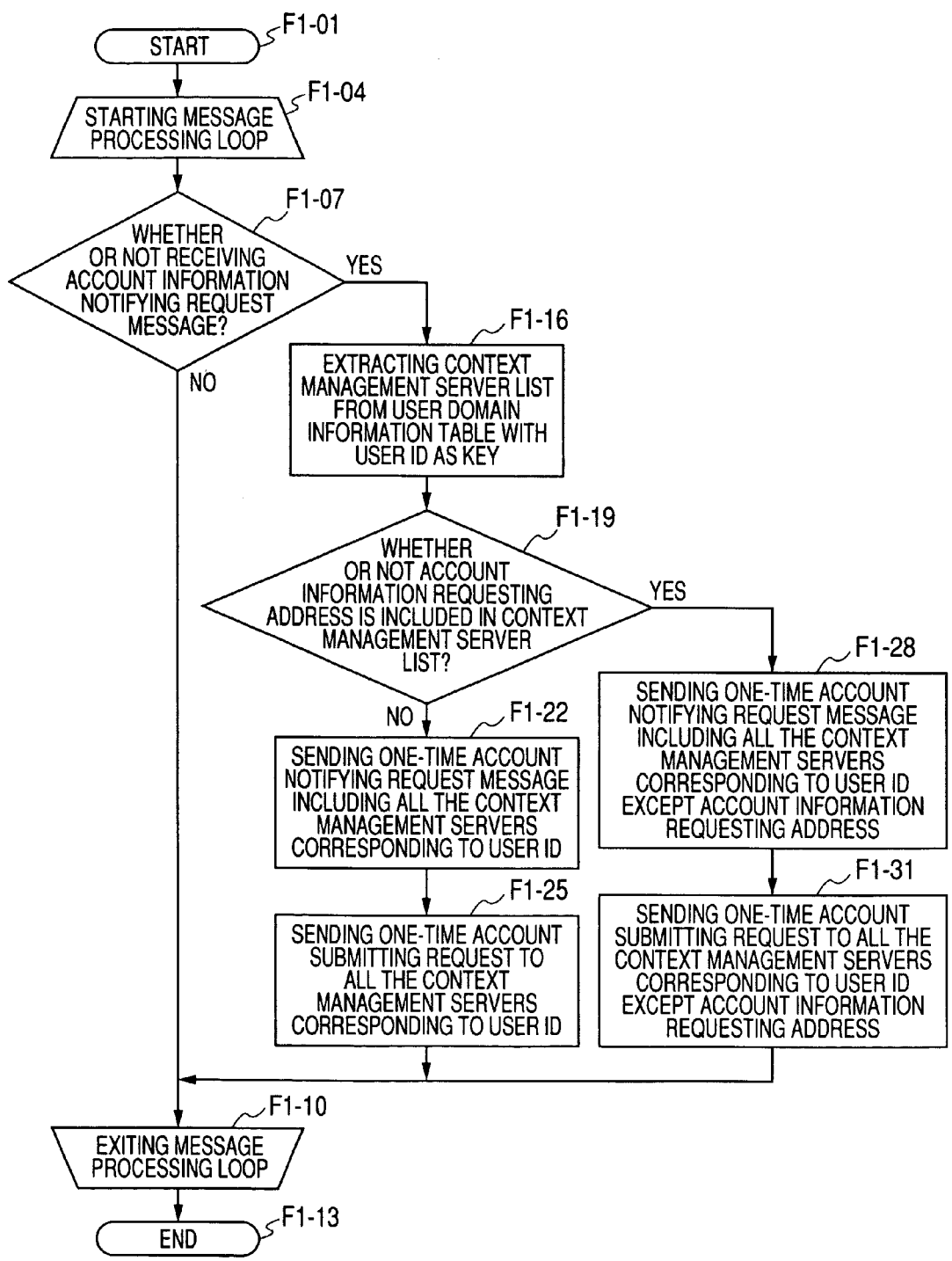
FIG. 12 is a flowchart of a user domain management server.

The following shows processing flowcharts of respective devices in the context information management system. FIG. 12 is a flowchart of the user domain management server 1. The user domain management server 1 performs initialization on startup, and starts a message reception loop (F1-01, F1-04). When an account information notifying request is received in the message reception loop (F1-07), the user domain management server 1 searches the user domain information table 141-A by using a user ID as key, and obtains a list of context management servers (F1-16). Next, it determines whether the requesting source of account information is included in the list of the obtained context management servers (F1-19). When not included, it sends a one-time account notifying request specifying all context management servers in the list to the one-time account management server 2 (F1-22), and sends a one-time account submitting request to all context management servers in the list (F1-25). When the requesting source of account information is included in the list of the context management servers, it sends a one-time account notifying request specifying context servers other than the requesting source of account information to the one-time account management server 2 in the list (F1-28), and sends a one-time account submitting request to all the context servers except the requesting source of account information (F1-31). The message reception loop ends when the user domain management server 1 shuts down (F1-10), and after halting the message reception loop, the user domain management server 1 halts the function (F1-13).

Figure 13:
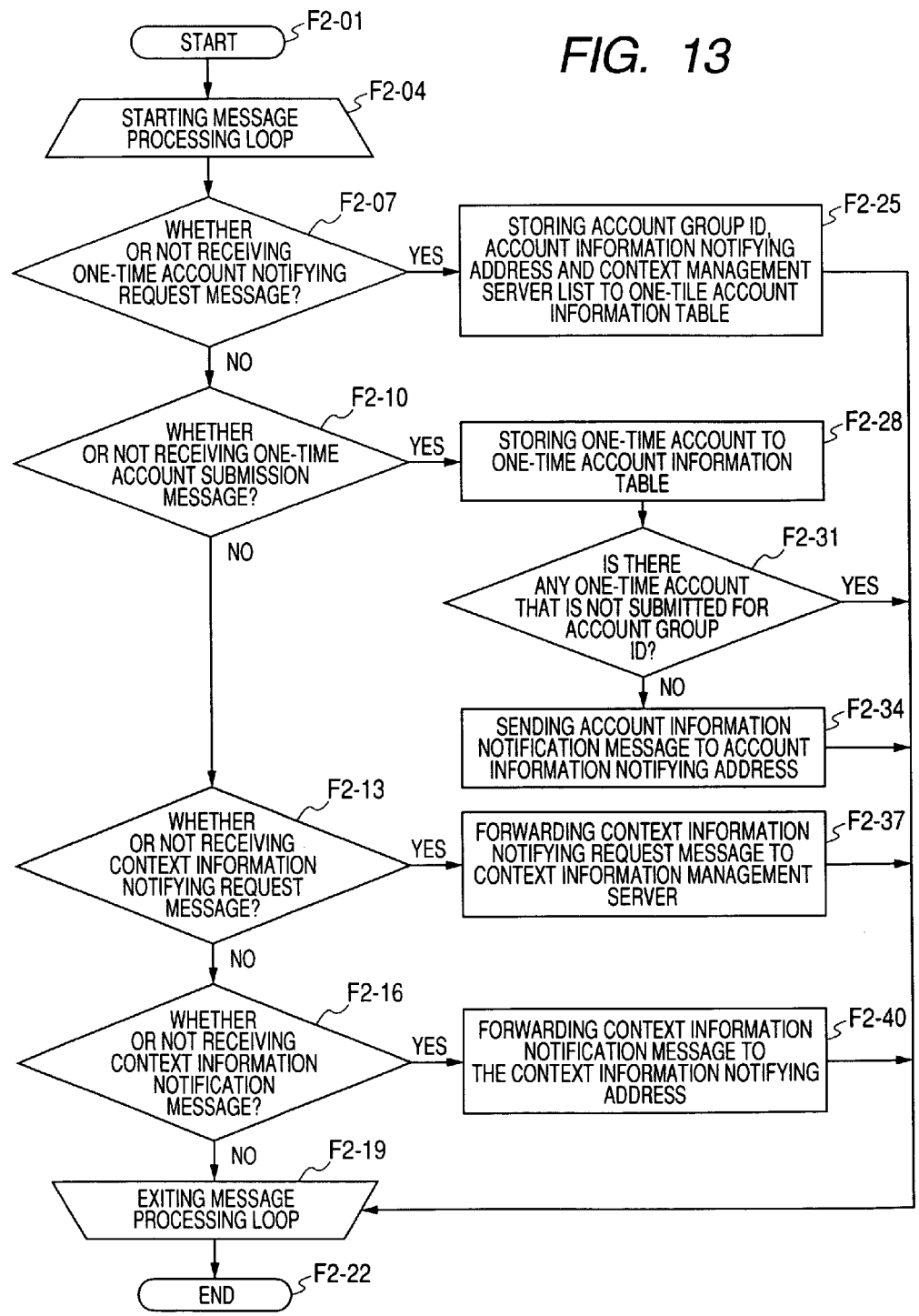
FIG. 13 is a flowchart of a one-time account management server.

FIG. 13 is a flowchart of the one-time account management server 2. The one-time account management server 2 performs initialization on startup, and starts a message reception loop (F2-01, 04). When receiving a one-time account information notifying request in the message reception loop (F2-07), the one-time account management server submits an account group ID, an information notifying address, and an context management server list specified in the message to the one-time account information table 241-A (F2-25). When receiving a one-time account submission message, it stores the one-time account in a corresponding record in the one-time account information table 241-A (F2-28). Next, it determines whether there is any one-time account that is not submitted for an account group ID of the indicated one-time account (F2-31). When there is no one-time account not submitted, since it means that submission processing of the one-time account is completed, the one-time account management server 2 sends an account information notification message to the account information notifying address (F2-34). When receiving a context information notifying request (F2-13), it decides the address of a context management server as a destination from the one-time account information table 241-1 forwards a message (F2-37). When receiving a context information notification message (F2-16), it forwards the message to a context information notifying address specified in the message (F2-40). The message reception loop ends when the one-time account management server 2 shuts down (F2-19), and after halting the message reception loop, the one-time account management server 2 halts the function (F2-22).

Figure 14:
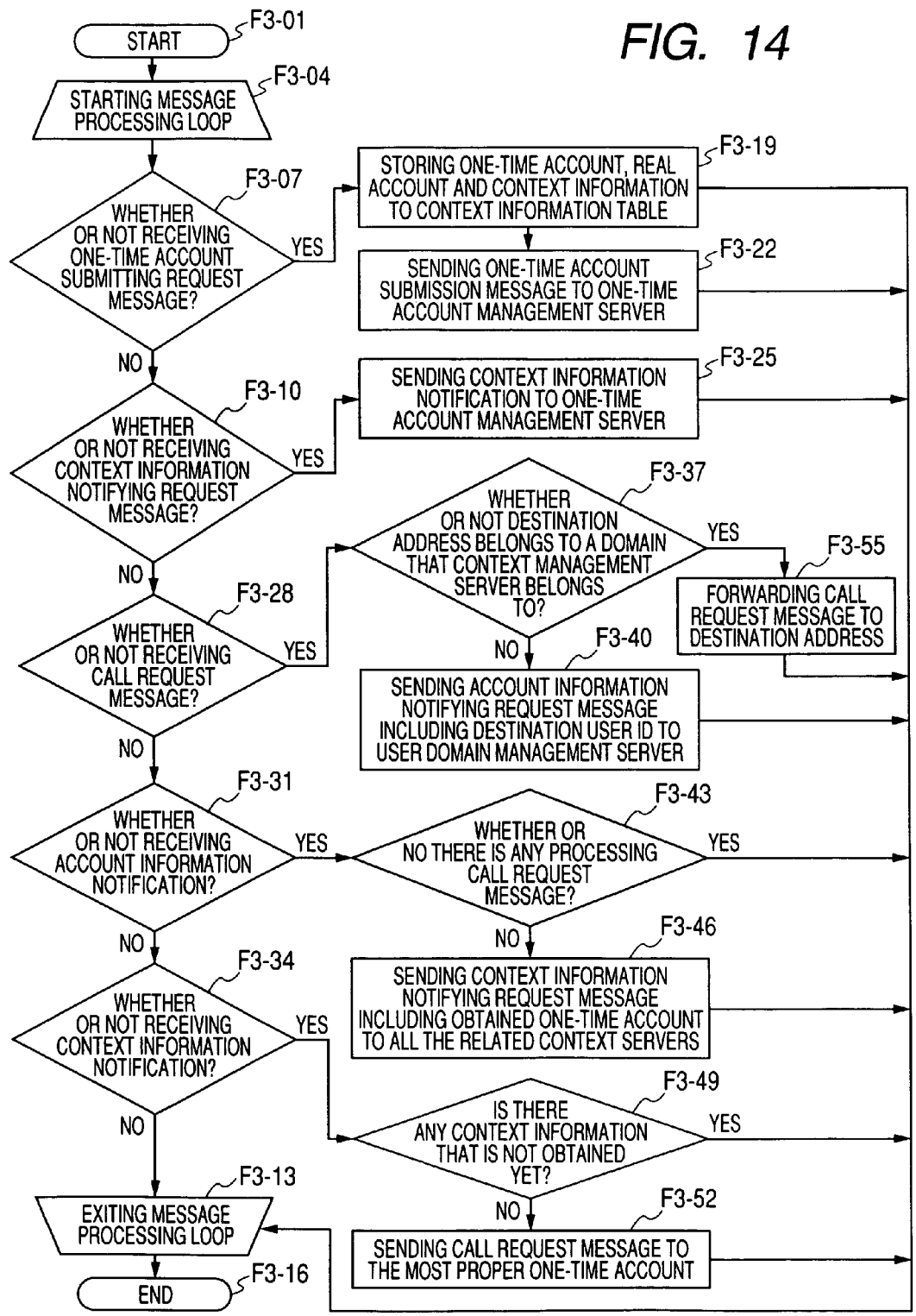
FIG. 14 is a flowchart of a context management server.

FIG. 14 is a flowchart of the context management server 5. The context management server 5 performs initialization on startup, and starts a message reception loop (F3-01, F3-04). When receiving a one-time account submitting request in the message reception loop (F3-07), the context management server 5 creates a one-time account, submits a set of the one-time account, an actual account, and context information to the context information table 541-A (F3-19), and sends the created one-time account to the one-time account management server (F3-22). When receiving a context information notifying request (F3-10), to notify context information for the requested account, it sends context information notification to the one-time account management server (F3-25). When receiving a call request (F3-28), the context management server determines whether a destination address belongs to domains managed by it (F3-37). When the destination is a client of domains managed by it, it forwards the call request to the client (F3-55). Otherwise, the call request corresponds to a new call. At this time, the context management server, to collect information necessary to decide a forwarding destination of the call request, forwards an account information notifying request that sets the user ID of a destination user, to the user domain management server (F3-40). When receiving an account information notification (F3-31), the context management server determines whether the call request is being processed (F3-43). When the call request is being processed, since the account information corresponds to a preparation for deciding a forwarding destination of a message, as next processing, the context management server sends a context information notifying request that specifies the obtained one-time account, to all the related context management servers (F3-46). When receiving context information notification (F3-34), the context management server determines whether it has obtained all context information of the user (F3-49). When there is context information not obtained, it waits until obtaining all context information. When all context information of the user specified in the call request has been already obtained, the context management server decides an optimum forwarding destination of the message from the context information, and forwards the call request (F3-52). The message reception loop ends when the context management server 5 shuts down (F3-13), and after halting the message reception loop, the context management server 5 halts the function (F3-16).

Figure 15:
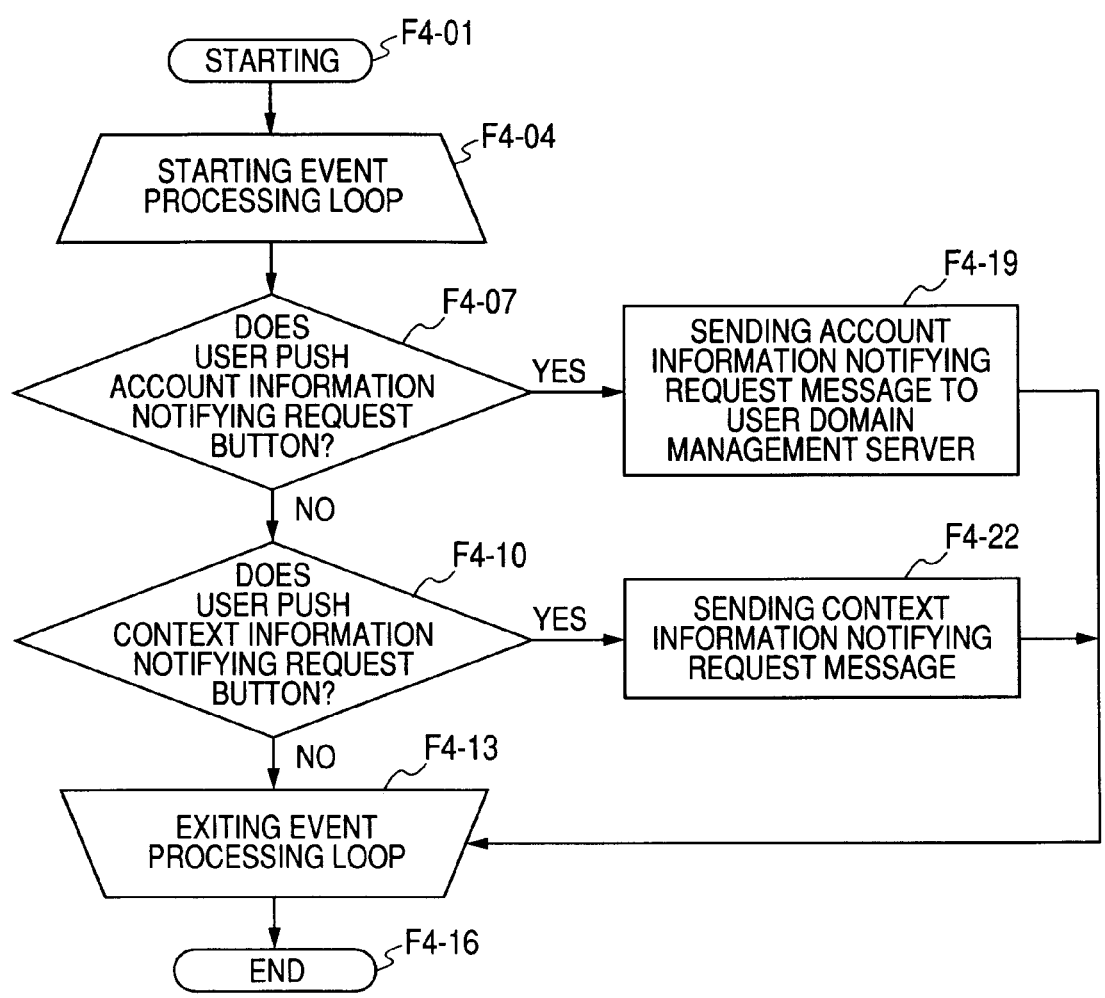
FIG. 15 is a flowchart of a client.

FIG. 15 is a flowchart of client 6. The client 6 performs initialization on startup, and starts an event reception loop (F4-01, F4-04). The event loop plays the role of waiting for a user's operation and the arrival of a message via a network. When the user pushes an account information notifying request button (F4-07), the client 6, to obtain account information, sends an account information notifying request to the user domain management server 1 (F4-19). When the user pushes a context information notifying request button (F4-10), it sends a context information notifying request to the one-time account management server 2 (F4-22). The event reception loop ends when the client 6 shuts down (F4-13), and after halting the event reception loop, the client 6 halts the function (F4-16).

By the above-described invention, in a state in which a user has plural accounts in different domains, when other users communicate with the user, even when context information corresponding to all the user's accounts is not known, account information of the user is requested from the user domain management server by using a user ID, and in response to this, the one-time account management server notifies other users of a temporary one-time account issued to the user, whereby the other users obtain context information corresponding to all accounts of the user by the one-time account, and can communicate with the user by using proper means. The issued one-time account is temporary, and therefore information about a true account of the user never leaks.

As has been described above, in a context information management system according to the present invention, since users' account information and context information can be managed by the user domain management server and the one-time account management server while maintaining security, the present invention can be applied to a multimodal communication system in which one user has plural accounts and communication terminals corresponding to them over plural domains.

What is claimed is:

1. A context information management system that manages context information for a respective account of a user in each of a plurality of domains, the context information management system comprising:
    a user domain management server that holds a list of a plurality of domains in each of which a user has an account;
    a one-time account management server that receives a one-time account notifying request from the user domain management server, and manages temporary one-time accounts for the user;
    a plurality of context management servers that each exist in a respective domain of the plurality of domains and manage context information for the respective account of the user in the respective domain in which the context management server exists; and
    clients that provide the context information to other users,
    wherein the user domain management server sends the one-time account notifying request to the one-time account management server according to a request from the other users,
    wherein each of the plurality of context management servers issues a respective temporary one-time account corresponding to the respective account of the user in the respective domain in which the context management server exists based on a request from the user domain management server and submits the respective temporary one-time account to the one-time account management server, and
    wherein the one-time account management server has a function to notify a set of one-time accounts to the other users based on a set of the respective temporary one-time accounts submitted from the plurality of context management servers,
    wherein the user domain management server includes a user domain information table that stores the list of the plurality of domains in which the user has accounts, and based on the request of the other users, requests each of the context management servers belonging to respective ones of the plurality of domains on the list to submit the respective temporary one-time account issued by the context management server to the one-time account management server, and
wherein the one-time account management server manages a user ID that is an identifier of the user, an account group ID that is an identifier of all of the accounts of the user in the plurality of domains, and the respective temporary one-time accounts submitted from the plurality of context management servers in association with one another, forwards a context information notifying request for the respective temporary one-time accounts from the other users to the context management servers that submitted the respective temporary one-time accounts, and forwards a context information notification of the context management servers to appropriate clients among the clients that provide the context information to the other users.

2. The context information management system according to claim 1 wherein each of the context management servers, based on a request from the user domain management server, issues a respective temporary one-time account for a user ID specified by the user domain management server, and submits a set of an account group ID specified by the user domain management server and the issued respective temporary one-time account for the user ID to the one-time account management server.

3. The context information management system according to claim 2, wherein the context management servers send the context information to the one-time account management server, based on the context information notifying request for the respective temporary one-time accounts from the one-time account management server.

4. The context information management system according to claim 3, wherein the context management servers, based on a request from a client for a call request with only a user ID specified, collect account information and context information of the user ID, and decide a called client from the contents of the context information of the user ID.

5. The context information management system according to claim 4, wherein the client for the call request sends an account information notifying request to the user domain management server, based on a request from the other users.

* * * * *